United States Patent

Shimizu et al.

[11] Patent Number: 5,844,688
[45] Date of Patent: Dec. 1, 1998

[54] IMAGE PROCESSING SYSTEM FOR CONVERTING A COLOR PROCESSING COMMAND INTO A CONTROL SIGNAL USING AN EXTERNAL CONTROLLER

[75] Inventors: Yukihiko Shimizu; Shinobu Arimoto, both of Yokohama; Yoshiki Uchida, Kawasaki, all of Japan

[73] Assignee: Canon Kabushiki Kaisha, Tokyo, Japan

[21] Appl. No.: 655,606

[22] Filed: May 30, 1996

[30] Foreign Application Priority Data

May 31, 1995 [JP] Japan ................................. 7-133731

[51] Int. Cl.[6] ........................................ H04N 1/04
[52] U.S. Cl. .................... 358/296; 358/501; 358/530; 358/538; 345/109; 345/114; 382/164
[58] Field of Search .................... 358/296, 400, 358/401, 468, 500, 501, 518, 530, 538; 382/162, 164, 167; 395/101, 109, 112, 114

[56] References Cited

U.S. PATENT DOCUMENTS

| | | | |
|---|---|---|---|
| 4,958,219 | 9/1990 | Kadowaki | 358/75 |
| 5,481,365 | 1/1996 | Arimoto | 358/296 |
| 5,555,107 | 9/1996 | Funada et al. | 358/518 |
| 5,602,655 | 2/1997 | Arakawa et al. | 358/501 |
| 5,631,983 | 5/1997 | Ohnishi et al. | 358/538 X |

Primary Examiner—Peter S. Wong
Assistant Examiner—Gregory J. Toatley, Jr.
Attorney, Agent, or Firm—Fitzpatrick, Cella, Harper & Scinto

[57] ABSTRACT

An image processing system includes a host, a controller external to the host, and an image processing apparatus. The host includes a selecting device for selecting a color processing command representing conditions of plural color processing operations within the image processing apparatus, the controller includes converting means for converting the color processing command into a control signal corresponding to color processing for controlling the plural color processing operations within the image processing apparatus, and the image processing apparatus includes a color processing device for performing color processing on image data according to the control signal.

5 Claims, 9 Drawing Sheets

FIG. 7

| GAMMA | LOG (LUMINANCE DENSITY) CONVERSION | BLACK EXTRACTION | MASKING COEFFICIENT |
|---|---|---|---|
| GAMMA 0 (FOR READER) | FOR READER out = $-\chi/\alpha \text{LOG}_{10}(\text{in}/\chi)$ | min(YMC) K=min(YMC) | FOR READER MASK0 |
| GAMMA 1 (FOR VIDEO) | FOR VIDEO out = $-\kappa\chi/\alpha \text{LOG}_{10}(\text{in}/\chi)$ | min(YMC) K=min(YMC) | FOR READER MASK0 |
| GAMMA 2 (FOR CG) | THROUGH out = 255 − in | min(YMC) K=min(YMC) | FOR CG MASK02 |
| GAMMA 22 (FOR CG 100% UCR) | THROUGH out = 255 − in | min(YMC) K=min(YMC) | FOR CG 100% UCR MASK22 |
| GAMMA 4 (GRAY PRIORITY) | FOR READER out = $-\chi/\alpha \text{LOG}_{10}(\text{in}/\chi)$ | LGCR K=min(min/MAX) +min(1−min/MAX)(min/255)$^2$ | FOR MAP MASK04 |
| GAMMA 24 (GRAY PRIORITY 100% UCR) | FOR READER out = $-\chi/\alpha \text{LOG}_{10}(\text{in}/\chi)$ | LGCR K=min(min/MAX) +min(1−min/MAX)(min/255)$^2$ | FOR MAP 100% UCR MASK24 |

※ $\chi$ REPRESENTING THE NUMBER OF GRADATION (ORDINARY 255)
 $\alpha$ AND $\kappa$ REPRESENTING POSITIVE CONSTANTS

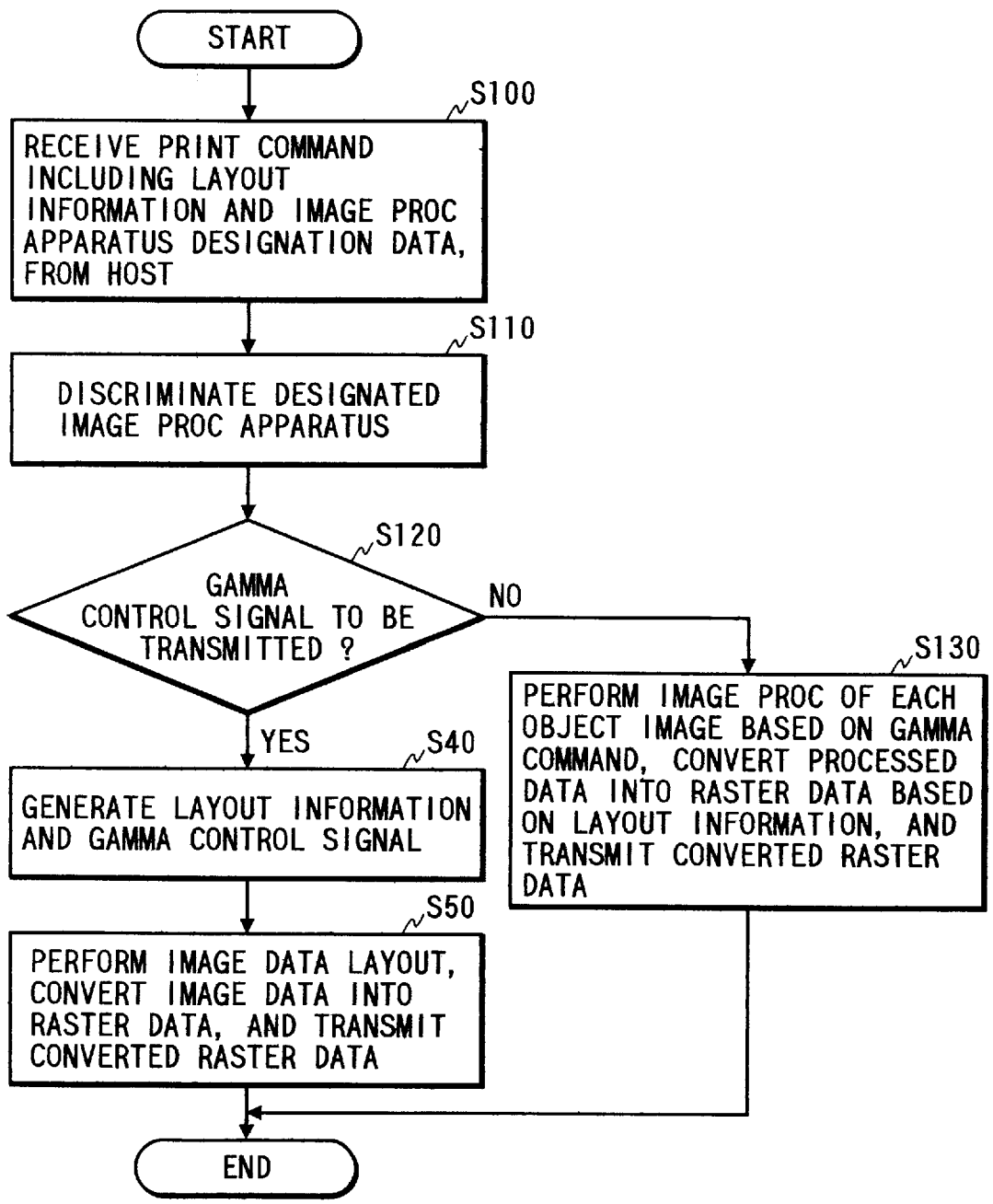

IMAGE PROCESSING SYSTEM FOR CONVERTING A COLOR PROCESSING COMMAND INTO A CONTROL SIGNAL USING AN EXTERNAL CONTROLLER

BACKGROUND OF THE INVENTION

1. Field of the Invention

The present invention relates to an image processing system and a controller which perform color processing on the basis of external control signals.

2. Related Background Art

In recent years, remarkable advances have been made in color printing systems such as a color printing apparatus for digitally processing color image data, and outputting the processed color image data to a color printer to obtain a color image, and a so-called digital color copying machine for color-separating and electrically reading a color original image, and printing obtained color image data on a paper sheet, thus performing a color image copying operation.

Of these systems, a color printing system constituted by a host, a controller, and a copying machine is available.

In this system, in performing image communication between the controller and the copying machine, C, M, Y, and K image data are used. For this reason, the controller has a circuit arrangement for generating high-quality C, M, Y, and K image data.

With regard to this system, a technique of allowing a user to set color processing parameters for color processing from the host in accordance with image futures has been proposed.

There is, however, room for improvement in the above proposal.

According to the above proposal, if the user has a good knowledge of color processing, he/she can perform high-precision color processing in accordance with the user's application purpose.

If, however, the user's knowledge is poor, it is very difficult to set high-precision color processing.

SUMMARY OF THE INVENTION

The present invention has been made in consideration of the above situation, and has as its object to allow a user to easily set color processing suitable for an image without a good knowledge of color processing.

It is another object of the present invention to efficiently perform color processing by using an external unit and an image processing apparatus.

In order to achieve the above objects, the present invention has the following arrangements.

According to the first aspect of the present invention, there is provided an image processing system constituted by a host, a controller, and an image processing apparatus, comprising selection means, arranged in the host, for selecting a color processing command, in which parameters associated with a plurality of color processing operations in the image processing apparatus are set in advance, in accordance with an image, conversion means, arranged in the controller, for converting the color processing command into a control signal corresponding to color processing for controlling the plurality of color processing operations in the image processing apparatus, and color processing means, arranged in the image processing apparatus, for performing color processing for image data on the basis of the control signal.

According to the second aspect of the present invention, there is provided an image processing system constituted by an external unit and an image processing apparatus which generate a synthetic image by synthesizing a plurality of images, comprising storage means, arranged in the external unit, for storing the plurality of images, generation means for synthesizing the plurality of images to generate and transmit synthetic image data in a raster form, issuing means for issuing area information of each of the images in the synthetic image, and a control signal for controlling the image processing apparatus for each of the areas, reception means, arranged in the image processing apparatus, for receiving the synthetic image data in the raster form, the area information, and the control signal, output means for outputting a parameter setting signal synchronous with the synthetic image data in the raster form and used to set parameters for the color processing corresponding to an area on the basis of the area information and the control signal, and color processing means for performing the color processing for the synthetic image data in the raster form on the basis of the parameter setting signal.

According to the third aspect of the present invention, there is provided an controller comprising reception means for receiving a color processing command which is selected in accordance with an image in a host and in which parameters associated with a plurality of color processing operations in an image processing apparatus are set, conversion means for converting the color processing command into a control signal corresponding to each color processing to control the plurality of color processing operations in the image processing apparatus, and output means for outputting the control signal to the image processing apparatus for performing color processing of image data on the basis of the control signal corresponding to each of the color processing operations.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing the contents of gamma sets in the first embodiment;

FIG. 12 is a flow chart showing the flow of processing in a controller in the second embodiment.

DETAILED DESCRIPTION OF THE PREFERRED EMBODIMENTS (First Embodiment)

Preferred embodiments of the present invention will be described in detail below with reference to the accompanying drawings. A system of an embodiment is constituted by a host, a controller, and an image processing apparatus.

Figure 1:
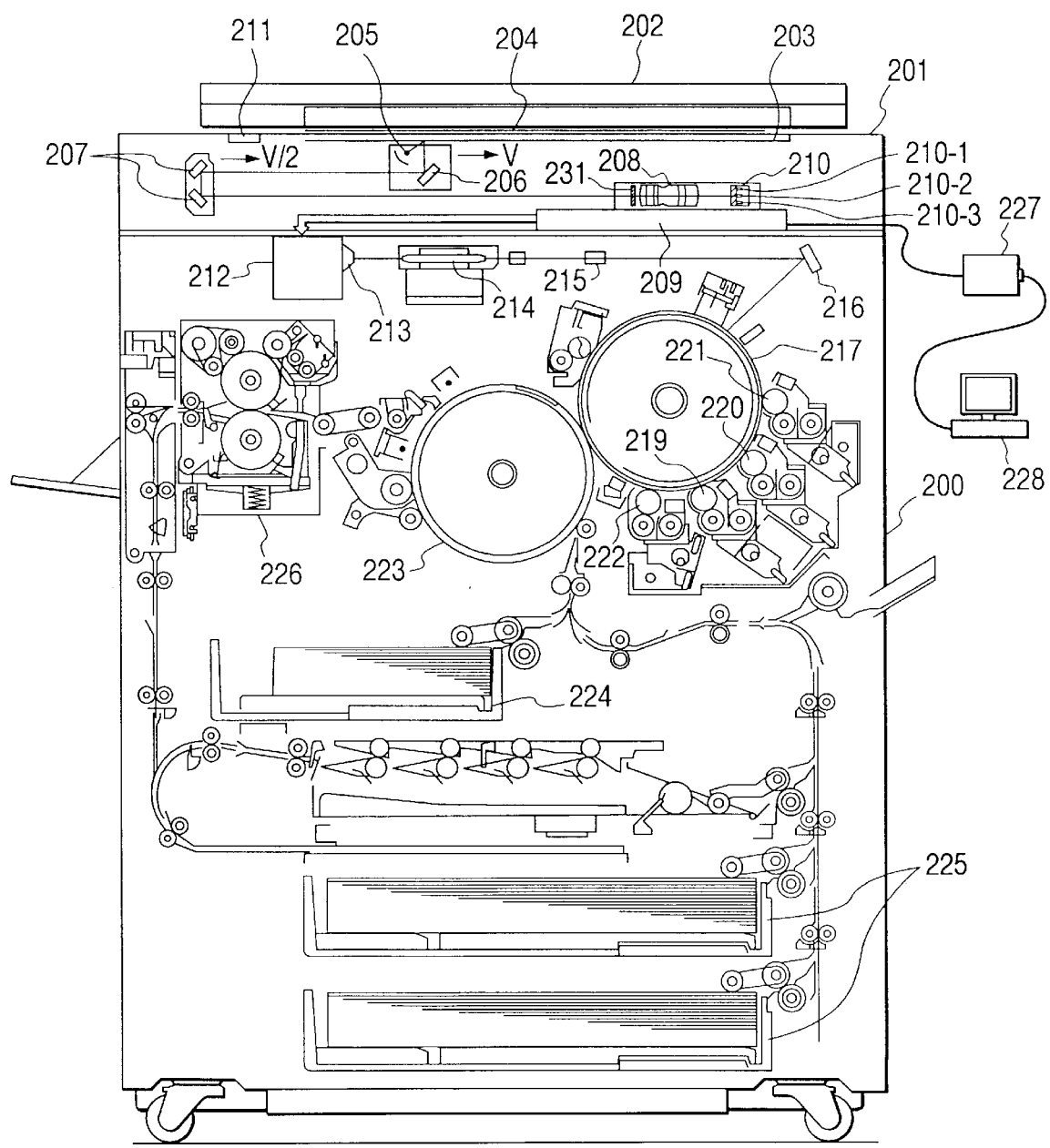
FIG. 1 is a sectional view showing the arrangement of an image processing apparatus according to an embodiment of the present invention.

FIG. 1 shows the overall arrangement of the image processing apparatus in this embodiment.

In an image scanner unit 201, an original 204 which is placed on an original table glass (platen) 203 and is pressed by an original pressing plate 202 is irradiated with light emitted from a halogen lamp 205. Light reflected by the original 204 is guided by mirrors 206 and 207, and forms an image on a 3-line sensor (to be referred to as a "CCD" hereinafter) 210 via a lens 208. Note that the lens 208 is provided with an infrared cut filter 231.

The CCD 210 color-separates optical information from the original 204, and reads the red (R), green (G), and blue (B) components of full-color information. The CCD 210 supplies the read R, G, and B component signals to a signal processing unit 209. Each of color component reading sensor arrays of the CCD 210 consists of 5,000 pixels. With this operation, the 297-mm widthwise portion of an A3-size original, the maximum size of those of originals to be placed on the original table glass 203, is read at a resolution of 400 dpi.

Note that the halogen lamp 205 and the mirror 206 are mechanically moved at a velocity v and the mirror 207 is mechanically moved at a velocity (½)v in a direction (to be referred to as a sub-scan direction hereinafter) perpendicular to the electrical scanning direction (to be referred to as a main-scan direction hereinafter) of the line sensor 210, thereby scanning the entire surface of the original 204.

A standard white plate 211 generates correction data for data read by R, G, and B sensors 210-1 to 210-3. The standard white plate 211 has almost uniform reflection characteristics for visible light, and has a white color under the visible light. In this case, using the standard white plate 211, output data from the R, G, and B sensors 210-1 to 210-3 are corrected.

The image signal processing unit 209 switches the read signals and an image signal supplied from a host 228 via a controller 227, electrically processes these signals to separate them into magenta (M), cyan (C), yellow (Y), and black (Bk) components, and supplies these color component signals to a printer unit 200. One of M, C, Y, and Bk components is supplied to the printer unit 200 per original scan in the image scanner unit 201 (field sequential image formation), and a single print-out is completed by a total of four original scans.

In the printer unit 200, the image-processed M, C, Y, and Bk image signals are supplied to a laser driver 212. The laser driver 212 modulates and drives a semiconductor laser 213 in accordance with the image signals. A laser beam scans the surface of a photosensitive drum 217 via a polygonal mirror 214, an f-θ lens 215, and a mirror 216.

A developer is constituted by a magenta developer 219, a cyan developer 220, a yellow developer 221, and a black developer 222. These four developers are alternately brought into contact with the photosensitive drum 217 to develop M, C, Y, and Bk electrostatic latent images formed on the photosensitive drum 217 with toners. A paper sheet fed from a paper feed cassette 224 or 225 is wound around a transfer drum 223, and each toner image developed on the photosensitive drum 217 is transferred onto the paper sheet.

In this manner, after toner images of four colors M, C, Y, and Bk are sequentially transferred, the paper sheet is exhausted via a fixing unit 226.

Figure 3:
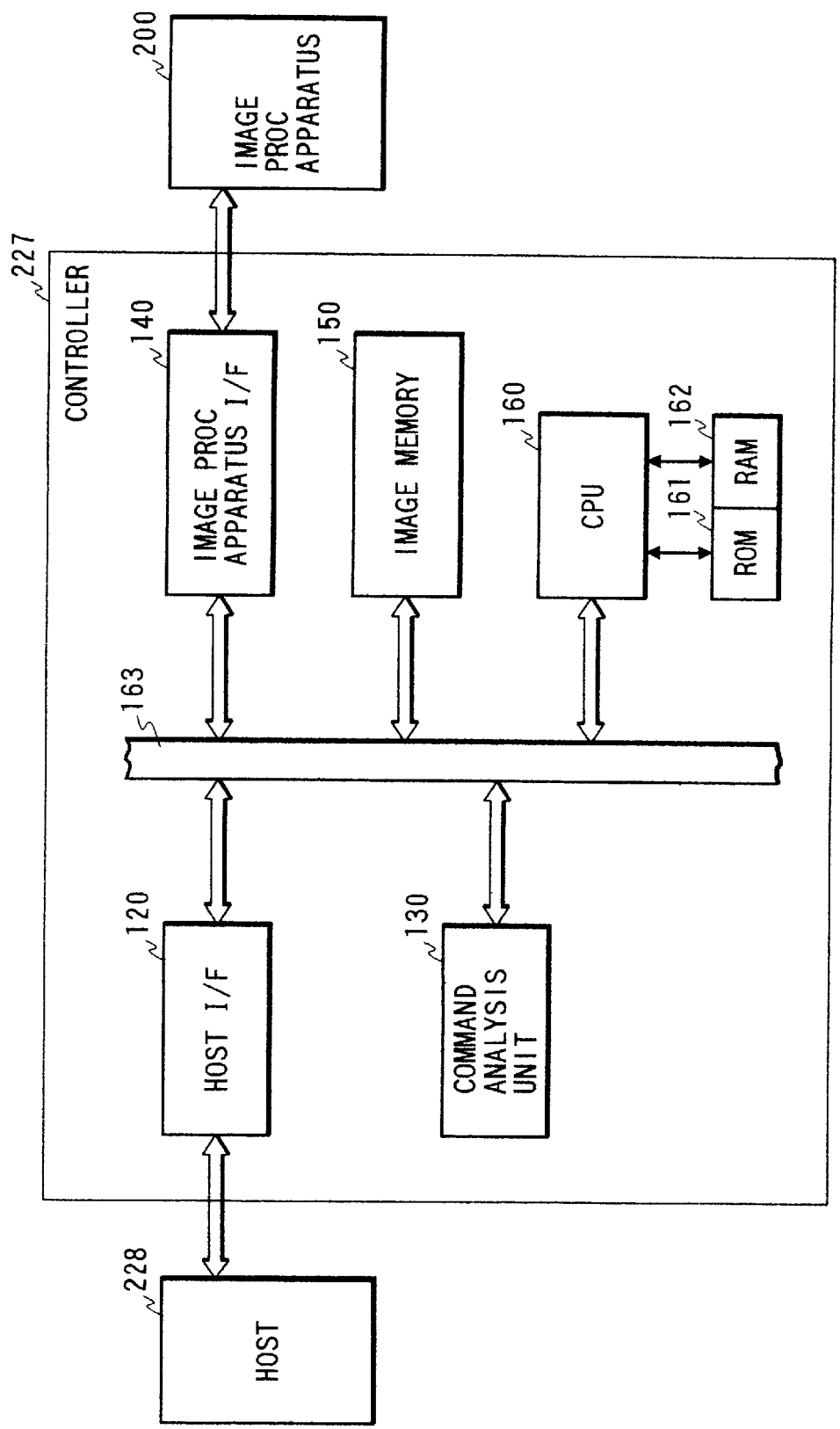
FIG. 3 is a block diagram showing the arrangement of a controller according to the first embodiment.

FIG. 3 is a block diagram showing the arrangement of the controller 227 in this embodiment.

A host I/F 120 and an image processing apparatus I/F 140 communicate various commands and image data with the host 228 and the image processing apparatus 200.

A command analysis unit 130 analyzes and stores various commands from the host 228.

Figure 5:
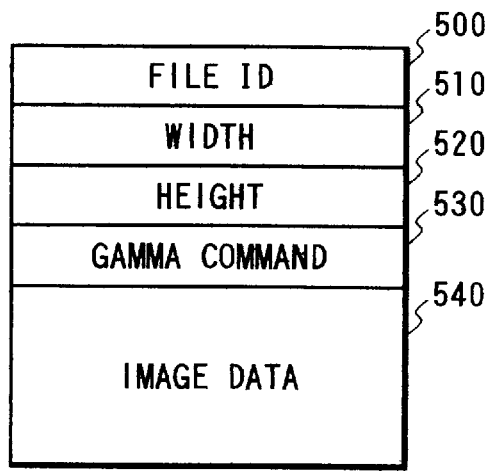
FIG. 5 is a view showing a file format in the first embodiment.

An image memory 150 stores image data input from the host 228 and the image processing apparatus 200, with the header information shown in FIG. 5 being added to the image data.

A CPU 160 controls the above components by using a RAM 162 on the basis of programs stored in a ROM 161.

A bus 163 connects the above components to each other.

Figure 2:
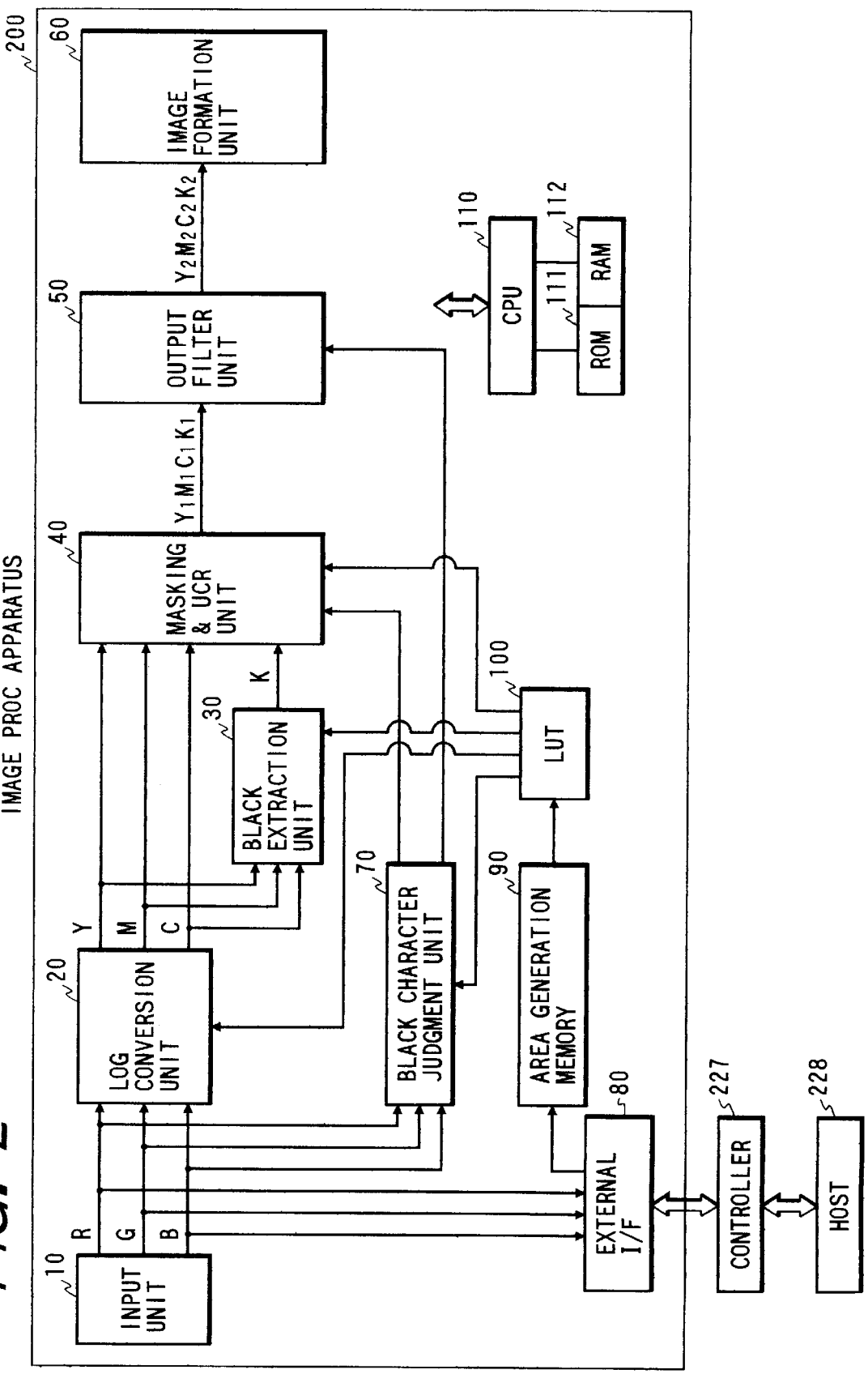
FIG. 2 is a block diagram showing the arrangement of an image processing apparatus according to the first embodiment of the present invention.

FIG. 2 is a block diagram mainly showing the arrangement of the image processing apparatus for image signal processing.

An input unit 10 includes the image scanner unit 201. The input unit 10 scans an original to generate image data, and corrects the reading characteristics of the image scanner unit 201 and the like in accordance with the obtained image data, thereby outputting R, G, and B image data.

A log conversion unit 20 performs luminance/density conversion of converting the R, G, and B image data into Y, M, and C image data on the basis of set parameters. The log conversion unit 20 is constituted by an LUT.

A black extraction unit 30 receives the Y, M, and C image data and performs black extraction on the basis of set black extraction parameters.

A masking and UCR unit 40 performs arithmetic processing on the basis of set coefficients to correct grayness caused by recording coloring agents in an image formation unit 60 with respect to the input Y, M, C, and K data, thereby generating field sequential Y, M, C, and K image data in synchronism with image formation.

An output filter unit 50 performs edge emphasis or smoothing processing on the basis of a filter signal from a black character judgment unit 70.

The image formation unit 60 forms an image on a recording medium on the basis of field sequential $Y_2$, $M_2$, $C_2$, and $K_2$ image data.

Figure 8:
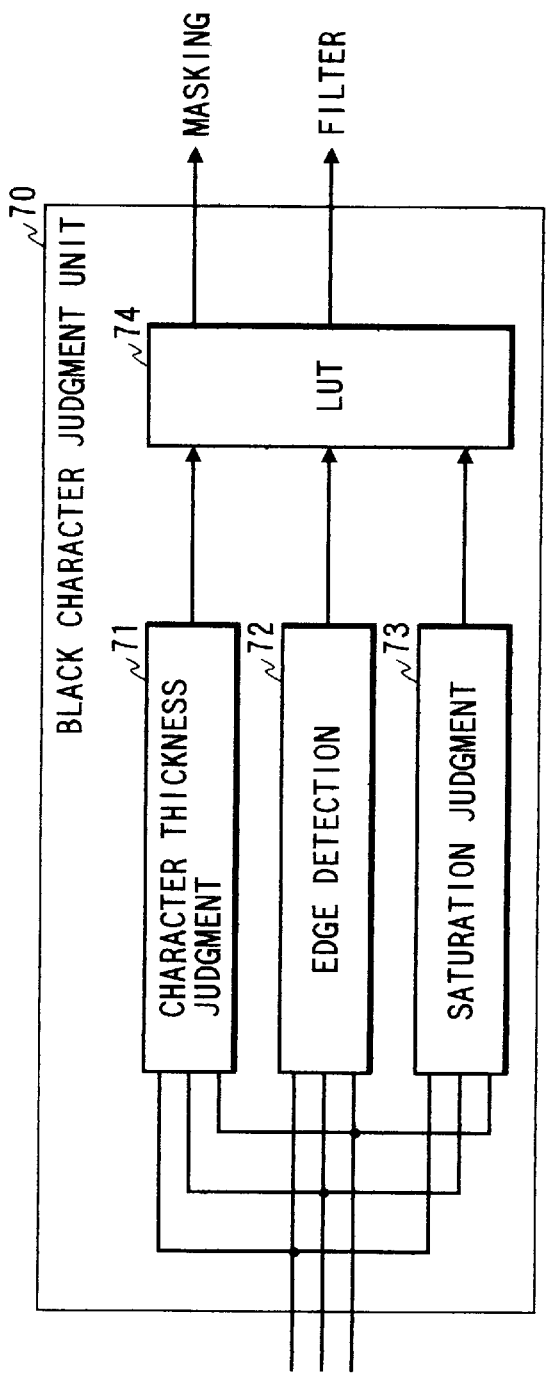
FIG. 8 is a block diagram showing the arrangement of a black character judgment unit in the first embodiment.

As shown in FIG. 8, the black character judgment unit 70 performs character thickness judgment, edge detection and saturation judgment on the basis of the R, G, and B image data, and outputs signals for controlling coefficients for the masking and UCR unit 40 and the output filter on the basis of the respective detection and judgment results.

A character thickness judgment 71 judges the length of consecutive pixels between pixels judged as edge portions.

Figure 9:
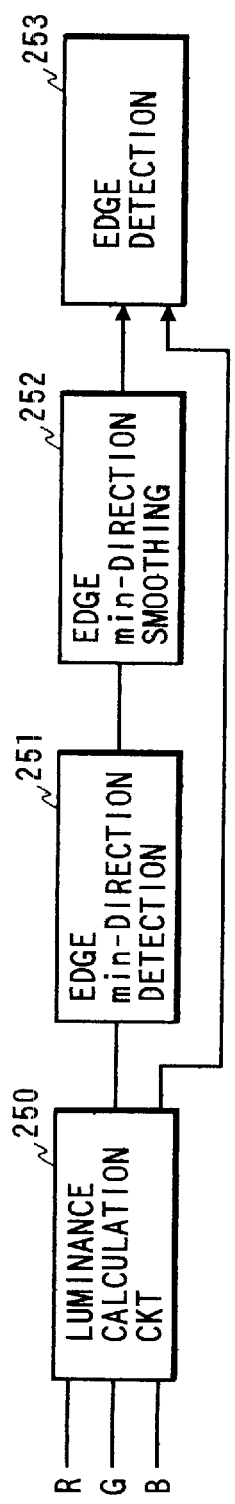
FIG. 9 is a block diagram showing the arrangement of edge detection in the first embodiment.

Edge detection 72 has an arrangement like the one shown in FIG. 9.

A luminance calculation circuit 250 generates a luminance signal Y from the input R, G, and B image data according to the following equation:

$$Y = 0.25R + 0.5G + 0.25B$$

The luminance signal Y is delayed line by line to be expanded to signals for three lines. Then, these signals are filtered by known Laplacian filters. Of the four directions, a direction to obtain a minimum absolute value a of the edge amount as the output from the filter is obtained, and this direction is determined as an edge min direction. This operation is performed by an edge min-direction detection unit 251 shown in FIG. 9.

An edge min-direction smoothing unit 252 then performs smoothing processing in the edge min direction detected by the edge min-direction detection unit 251. With this processing, only a direction corresponding to the largest edge component is preserved, and other directions can be smoothed.

More specifically, the following effect is obtained. That is, upon the above-mentioned processing, the feature of halftone dot components including large edge components in a plurality of directions decreases since the edge components are smoothed while the feature of a character/thin line including edge components in only one direction is preserved. By repeating this processing as needed, line components and halftone dot components can be separated more effectively, and a character component present in a halftone dot area, which cannot be detected by a conventional edge detection method, can be detected.

Thereafter, an edge detection unit 253 shown in FIG. 9 removes signals equal to or smaller than an appropriate threshold value th_edge from signals directly input from the luminance calculation circuit 250 to the edge detection unit 253, and outputs signals larger than th_edge as signals of logic "1". Furthermore, the signals input via the edge min-direction smoothing unit 252 are filtered by the above-mentioned Laplacian filters, and the absolute value of the edge amount is compared with a threshold value th_edge2, thus coding the output value in accordance with a rule to be described later. In this manner, edges having two different natures are selectively used. For characters in a white background, edge detection is performed using edges which do not pass the edge min-direction smoothing unit, thus detecting edges up to the details of characters. On the contrary, for characters in a halftone dot area, edge detection is performed using edges which pass the edge min-direction smoothing unit, thus detecting only characters and lines without detecting halftone dot components.

The edge detection unit 253 furthermore outputs a combination of the following signals, of the above judgment signals: signals obtained by expanding judgment results, based on th_edge, in 7×7, 5×5, and 3×3 block sizes, and signals judged by th_edge2 without expansion. Note that the expansion of the signal means logical ORing of signals of all the pixels in a block.

Figure 10:
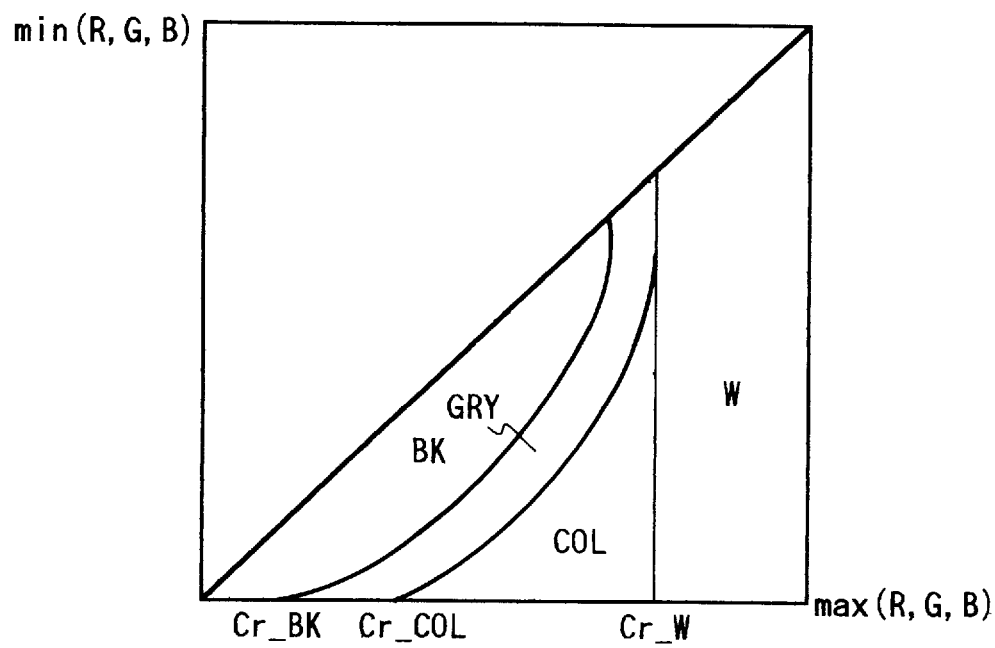
FIG. 10 is a graph for explaining saturation judgment in the first embodiment.

FIG. 10 is a graph for explaining saturation judgment 73 constituting the black character judgment unit 70. In this case, a maximum value max(R,G,B) and a minimum value min(R,G,B) are extracted from input R, G, and B signals. A saturation signal Cr is generated on the basis of a specific one of divided areas like those shown in FIG. 10 based on threshold values Cr_BK, Cr_COL, and Cr_W to which a combination of the maximum value max(R,G,B) and the minimum value min(R,G,B) belongs.

The saturation signal Cr from the saturation judgment 70 represents black by a 2-bit code when data falls within an area Bk shown in FIG. 10; an intermediate color (a color between a given color and black) when data falls within an area GRY; and white when data falls within an area W.

An LUT 74 outputs control signals for controlling coefficients for the masking and UCR unit 40 and the output filter and black extraction processing on the basis of results obtained by the character thickness judgment 71, the edge detection 72, and the saturation judgment 73.

An external I/F 80 inputs raster image data, layout information (i.e., the area data of each object image), and a gamma control signal from the controller 227. The raster image data is output to the log conversion unit 20, and the layout information and the gamma control signal are output to an area generation memory 90.

The area generation memory 90 develops and stores the gamma control signal on the basis of the input layout information and gamma control signal. The area generation memory 90 outputs the gamma control signal to an LUT 100 in synchronism with color processing for the input image data so as to control parameters for each color processing.

The area generation memory 90 analyzes a combination of layout information and a gamma control signal which corresponds to each file input from the controller, and stores the gamma control signal developed in units of pixels with a predetermined resolution on the basis of the layout information.

By storing the gamma control signal developed in units of pixels with the predetermined resolution in the area generation memory 90, the gamma control signal can be output to the LUT 100 in synchronism with high-speed color processing.

On the basis of the gamma control signal from the area generation memory 90, the LUT 100 outputs a corresponding control signal to each correction unit.

Processing to be performed when a gamma as a set of image processing control commands is sent from the host to the image signal processing unit will be described below.

The operator sets one of six types of gammas shown in FIG. 7, on the host, in correspondence with an image to be output. The host transmits a control signal consisting of at least three bits and capable of uniquely determining six types of gammas. Upon reception of this signal, the controller generates a gamma control signal corresponding to each gamma, and transmits the gamma control signal to the image signal processing apparatus, together with an image signal. Upon reception of the gamma control signal sent from the controller, the image signal processing apparatus sets image processing coefficients corresponding to the gamma control signal. In this embodiment, with respect to one gamma set, the image signal processing apparatus sets optimal coefficients for luminance/density conversion processing (LOG conversion processing), black extraction processing, masking and UCR processing, and black character judgment in accordance with the specifications of the gamma set. The image signal processing apparatus transmits M, C, Y, and K image signals, which have undergone image processing on the basis of the set black character processing coefficients, to the image formation unit. Upon reception of these signals, the image formation unit sequentially forms M, C, Y, and K toner images on a paper sheet, and exhausts the sheet.

Image processing performed by the image signal processing apparatus in accordance with each gamma will be described below.

With regard to gamma 0, an image read by the image scanner 200 is assumed. For this reason, image processing coefficient setting is performed in the same manner as that for an image read by the image scanner. More specifically, luminance/density conversion processing based on equation (1.00.1), black extraction processing based on equation (1.00.2), and masking UCR processing based on equation (1.00.3) are performed, and black character judgment coefficients are set for the scanner.

$$\text{out} = -\chi/\alpha \text{LOG}_{10}(\text{in}/\chi) \quad (1.00.1)$$

$$K = \min(YMC) \quad (1.00.2)$$

$$\text{MASK0:} \begin{pmatrix} Y \\ M \\ C \\ K \end{pmatrix} = M_{A00} \begin{pmatrix} y \\ m \\ c \\ k \end{pmatrix} + M_{B00} \begin{pmatrix} kk \\ ym \\ yc \\ mc \end{pmatrix} \quad (1.00.3)$$

where $\chi$ represents the number of gradation levels (ordinary 255), $\alpha$ represents a positive constant, and $M_{A00}$ and $M_{B00}$ represent 4×4 matrixes.

With regard to gamma 1, an image captured from a video signal is assumed. The coefficients of gamma 1 are the same as those of gamma 0 except for coefficients for luminance/density conversion processing based on equation (1.01.1):

$$\text{out} = -\kappa\chi/\alpha \text{LOG}_{10}(\text{in}/\chi) \quad (1.01.1)$$

where $\chi$ represents the number of gradation levels (ordinary 255), and $\alpha$ and $\kappa$ represent positive constants.

With regard to gamma 2, an image formed on a computer, i.e., a CG (computer graphics) image having undergone rendering, or a DTP image drawn by a wordprocessor/drawing tool, is assumed. An image formed on a computer has features such as no mixed noise and sharp edges.

With this gamma, luminance/density conversion processing based on equation (1.02.1) having linear gradation characteristics, black extraction processing based on equation (1.02.2), and masking and UCR processing similar to through processing and based on equation (1.02.3) are performed. At the same time, of the black character judgment coefficients, edge detection parameter th_edge for the edge detection 253, saturation judgment parameters Cr_BK, Cr_COL, and Cr_W, character binarization offsets, a threshold value for screen judgment, and the like are changed in accordance with the above characteristics.

$$\text{out} = 255 - \text{in} \quad (1.02.1)$$

$$K = \min(YMC) \quad (1.02.2)$$

$$\text{MASK02:} \begin{pmatrix} Y \\ M \\ C \\ K \end{pmatrix} = M_{A02} \begin{pmatrix} y \\ m \\ c \\ k \end{pmatrix} + M_{B02} \begin{pmatrix} kk \\ ym \\ yc \\ mc \end{pmatrix} \quad (1.02.3)$$

where $M_{A02}$ represents a 4×4 matrix closer to a unit matrix than $M_{A00}$, and $M_{B02}$ represents 4×4 matrixes closer to 0 (zero matrix) than $M_{B00}$.

In gamma 22, the maximum UCR amount in gamma 2 is changed from 80% to 100%. That is, the coefficients of gamma 22 are the same as those of gamma 2 except for the masking and UCR processing coefficients based on equation (1.22.3).

$$\text{MASK22:} \begin{pmatrix} Y \\ M \\ C \\ K \end{pmatrix} = M_{A22} \begin{pmatrix} y \\ m \\ c \\ k \end{pmatrix} + M_{B22} \begin{pmatrix} kk \\ ym \\ yc \\ mc \end{pmatrix} \quad (1.22.3)$$

where $M_{A22}$ represents a 4×4 matrix closer to a unit matrix than $M_{A02}$, and $M_{B22}$ represents a 4×4 matrix closer to 0 (zero matrix) than $M_{B02}$.

With regard to gamma 4, a gray priority image based on gamma 0 is assumed. In order to faithfully reproduce gray in a highlighted portion, in particular, this gamma is used to perform LGCR, i.e., black extraction based on equation (1.04.2) and masking and UCR processing based on equation (1.04.3), and to set black character judgment coefficients for the scanner.

$$K = \min(\min/\text{MAX}) + \min(1 - \min/\text{MAX})(\min/255)^2 \quad (1.04.2)$$

$$\text{MASK04:} \begin{pmatrix} Y \\ M \\ C \\ K \end{pmatrix} = M_{A04} \begin{pmatrix} y \\ m \\ c \\ k \end{pmatrix} + M_{B04} \begin{pmatrix} kk \\ ym \\ yc \\ mc \end{pmatrix} \quad (1.04.3)$$

where min and MAX represents the minimum and maximum values of C, M, Y, and K values, and $M_{A04}$ and $M_{B04}$ represent 4×4 matrixes.

In gamma 24, the maximum UCR amount in gamma 4 is changed from 80% to 100%. That is, the coefficients of gamma 24 are the same as those of gamma 4 except for the masking and UCR processing coefficients based on equation (1.24.3).

$$\text{MASK24:} \begin{pmatrix} Y \\ M \\ C \\ K \end{pmatrix} = M_{A24} \begin{pmatrix} y \\ m \\ c \\ k \end{pmatrix} + M_{B24} \begin{pmatrix} kk \\ ym \\ yc \\ mc \end{pmatrix} \quad (1.24.3)$$

where $M_{A24}$ and $M_{B24}$ represent 4×4 matrixes.

As described above, in the present invention, gamma data are set in correspondence with a plurality of input sources. That is, gamma 0, gamma 4, and gamma 24 are set for scanner images; gamma 1, for video images; and gamma 2 and gamma 22, for images formed on the computer.

The image processing apparatus of this embodiment includes an external I/F in addition to the input unit. Images from various input sources can therefore be input to the apparatus.

As in this embodiment, by setting a plurality of gamma data in correspondence with the input sources in advance, a user can easily set color processing suitable for each image without a good knowledge.

Figure 4:
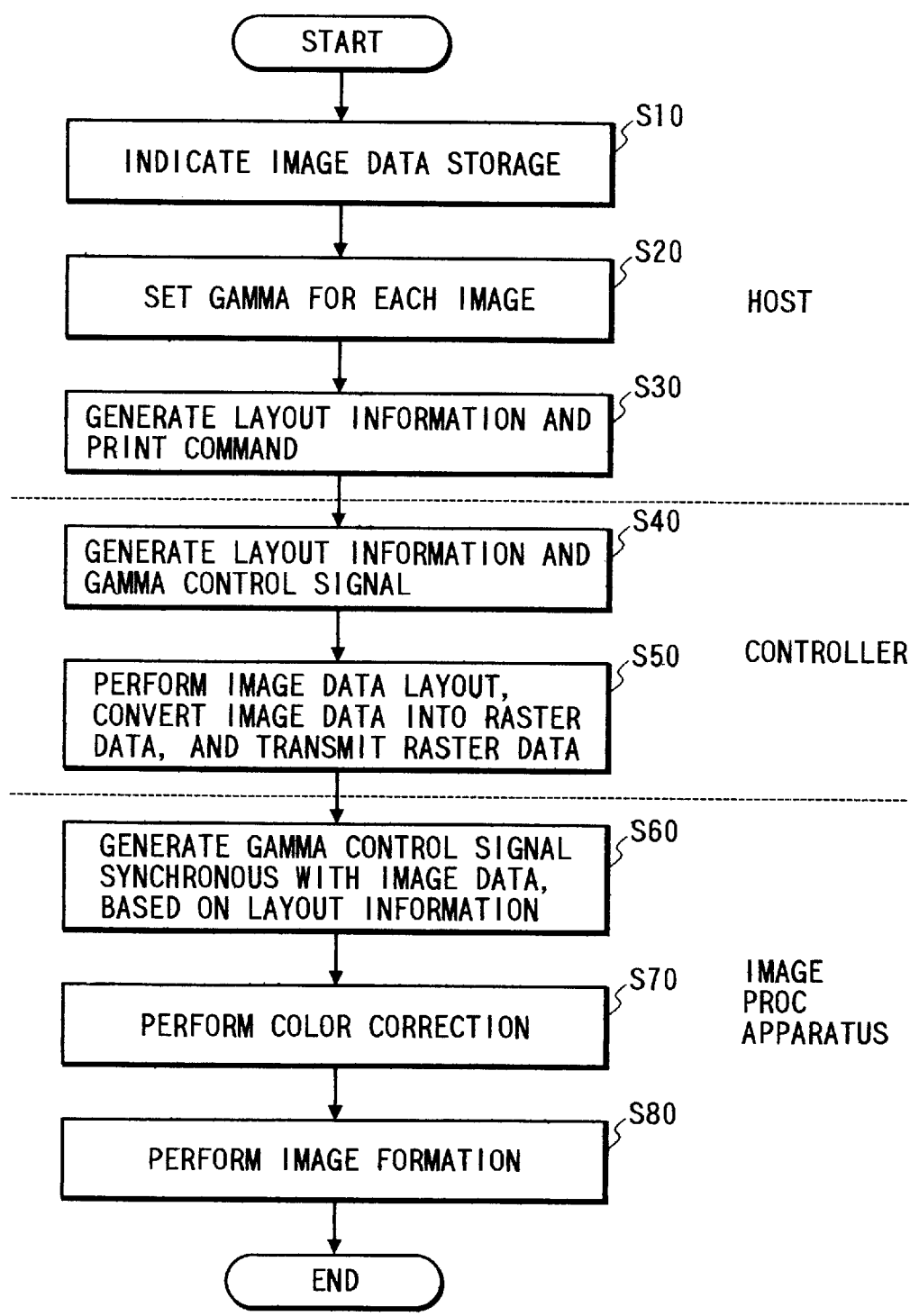
FIG. 4 is a flow chart showing a processing operation in the first embodiment.

An operation to be performed when image formation is performed by performing optimal color processing to each object image will be described below with reference to FIG. 4.

Note that steps S10 to S30 are associated with processing performed by the host 228; steps S40 to S50, processing performed by the controller 227; and steps S60 to S80, processing performed by the image processing apparatus 200.

An instruction is output to input each object image by using the image processing apparatus, form each object image on the host, or input each object image by using a scanner connected to the host, and store the image in the controller 227 in the file format shown in FIG. 5 (step S10). In this case, the header of the file is formed in accordance with an instruction input from the operator through the host to manage this image and is constituted by a file ID for managing the file, data 510 and 520 indicating the width and height of stored image data 540, and a gamma command representing parameters indicating various types of color processing for image data.

The user sets one of the gamma commands corresponding to the above gammas as the header of the file to the gamma command 530 through the host on the basis of the characteristics of the image data stored in the file or input image data to be stored in the file (step S20).

The processing in steps S10 and S20 is performed for each object image to store a plurality of files in the controller 227.

Figure 6:
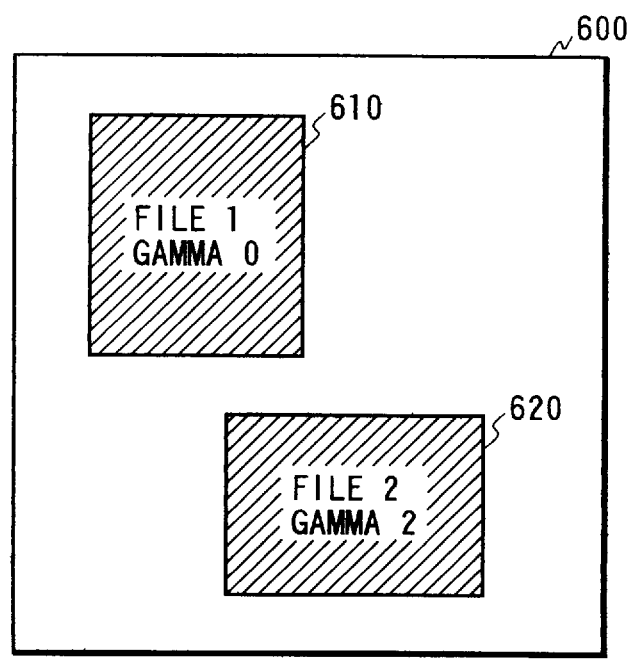
FIG. 6 is a view showing a synthetic image in the first embodiment.

In order to lay out the plurality of files and form a synthetic image like the one shown in FIG. 6, the user sets layout information indicating the specific position of each object image, i.e., each file within one page, and issues a print command through the host 228. The host 228 generates layout information indicating the position of each object image, i.e., the area of each object image, and a print command to the controller 227 on the basis of the instruction from the user (step S30).

Upon reception of the layout information and the print command from the host 228, the controller 227 causes the command analysis unit 130 to analyze the command, and stores the resultant data. The controller 227 then outputs a gamma control signal for controlling the layout information indicating the area of each object image and color processing parameters for each object image to the image processing apparatus 200 to control color processing in the image processing apparatus in units of image areas (step S40).

Note that the gamma control signal is a control signal indicating, e.g., LOG conversion parameters, black extraction parameters, and masking coefficients which are to be set by the set command. This control signal is sequentially transmitted before transmission of image data.

In addition, on the basis of the layout information stored in the command analysis unit 130, the controller 227 generates raster data indicating the image on one page which is obtained by synthesizing the image data stored in the respective files, and transmits the raster data to the image processing apparatus 200 (step S50).

The processing in step S50 takes time because files are selected to be rearranged, and raster image data is generated. This processing can therefore be performed more efficiently by transmitting the gamma control signal before the raster image data is transmitted.

If the gamma control signal is transmitted before the raster image data is transmitted, the image processing apparatus can develop the gamma information at a predetermined resolution on the basis of the layout information and store the gamma control signal corresponding to each pixel in the area generation memory while the controller generates raster image data from each object image on the basis of the layout information.

The image processing apparatus 200 develops the received area information in correspondence with the gamma control signal, and stores the resultant data in the area generation memory 90. In addition, the image processing apparatus 200 outputs the gamma control signal, which is stored and developed in correspondence with the area of each received raster image data, to the LUT 100 in synchronism with color processing. The LUT 100 outputs a control signal in synchronism with the processing in each of the following units: black character judgment unit 70, the log conversion unit 20, the black extraction unit 30, and the masking and UCR unit 40 (step S60). When the image processing apparatus 200 develops the gamma control signal in this manner, the time taken for transfer of each gamma control signal between the controller 227 and the image processing apparatus 200 can be shortened.

Each color processing described above is performed for image data by using parameters corresponding to a control signal (step S70).

Luminance/density conversion processing parameters and black extraction coefficients for black character processing coefficient/LOG conversion are set in the black character judgment unit 70 on the basis of only a control signal from the LUT 100. Coefficients set in accordance with a control signal from the LUT 100 are modified on the basis of a control signal from the black character judgment unit 70. The resultant coefficients are set in the masking and UCR unit 40. That is, masking and UCR processing is set on the basis of the characteristics of each area and a corresponding pixel. Even if a gamma is set from the host 228, the black character judgment function of the image processing apparatus 200 can be used.

The image formation unit 60 forms an image on a recording medium on the basis of $Y_2$, $M_2$, $C_2$, and $K_2$ image data having undergone color processing (step S80).

As described above, according to this embodiment, high-precision color processing can be performed in accordance with an input source and an application purpose by efficiently using the function of the image processing apparatus 200.

In the above embodiment, as shown in FIG. 5, a gamma command is added, as a header, to image data. However, other attribute information, such as an input device name and a color reproduction range may be added.

With addition of other attribute information, the image processing apparatus can cope with more precise requirements.

The image processing apparatus may include a gamma correction unit for a color processing, and the unit may be set by an external unit.

In the above embodiment, each image is stored in a file, and a gamma command is set in the header of each file. However, a synthetic image may be stored in a file, and area information and a corresponding gamma command may be set as the header of the file.

In the above embodiment, after storage of image data is indicated (step S10), layout information and a print command are generated (step S30). However, for example, after layout information is set, each image may be input in correspondence with the layout.

In addition, parameters for each color processing which are set by a gamma command may be manually adjusted and registered.

As described above, according to the above embodiment, one of color processing commands in which parameters associated with a plurality of color processing operations are set is selected, the user can easily set color processing suitable for an image without any good knowledge of color processing.

In addition, processing can be efficiently performed by the external unit (controller) and the image processing apparatus.

(Second Embodiment)

Figure 11:
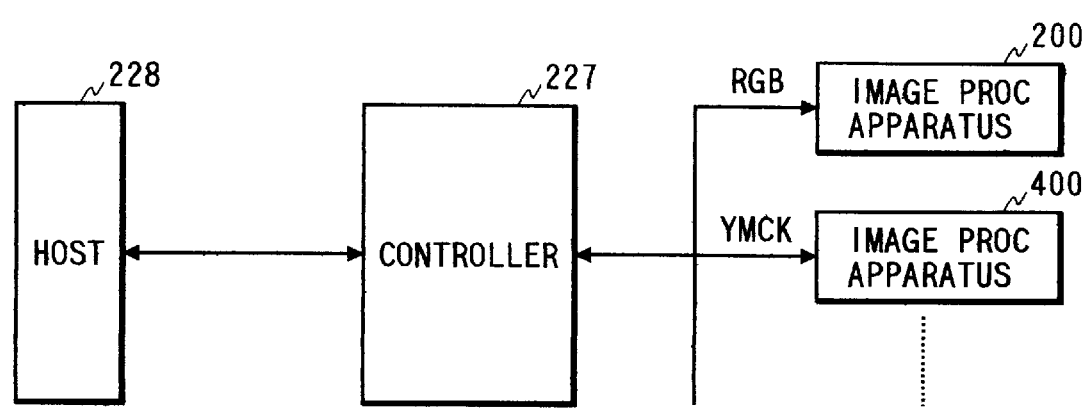
FIG. 11 is a block diagram showing a system according to the second embodiment of the present invention.

In the second embodiment, as shown in FIG. 11, a controller is connected to a plurality of types of image processing apparatuses 200 and 400 via communication lines.

In this embodiment, the image processing apparatus 200 has the same function as the image processing apparatus of the first embodiment, and receives R, G, and B image data as image data from the controller.

The image processing apparatus 400 receives Y, M, C, and K image data as image data from the controller. Since the image processing apparatus 400 receives Y, M, C, and K image data from the controller, the apparatus cannot perform masking and UCR processing for the image data received from the controller, which is performed for Y, M, and C image data. In this embodiment, therefore, when image data is to be transmitted to the image processing apparatus 400, image processing such as masking and UCR processing corresponding to a gamma command is performed by using the image processing function of the controller on the basis of the gamma command received from the host.

The flow of processing in the controller will be described below with reference to FIG. 12.

A print command including layout information and image processing apparatus designation data is received from the host (step S100).

The function of the designated image processing apparatus is discriminated by performing communication with the designated image processing apparatus (step S110).

It is checked on the basis of the discrimination result whether the designated image processing apparatus can perform image processing on the basis of the gamma control signal, thereby determining whether to transmit the gamma control signal (step S120).

If it is determined in step S120 that the gamma control signal is not transmitted, image processing for each object image is performed by using the image processing function of the controller on the basis of the gamma command. In addition, the resultant is converted into raster data on the basis of the layout information, and the raster data is transmitted (step S130).

On the contrary, if it is determined in step S120 that the gamma control signal is transmitted, the same processing (steps S40 and S50) as that in the first embodiment is performed.

As described above, according to this embodiment, image processing based on a gamma command from the host can be performed for each image data regardless of the function of image processing apparatus.

In addition, since a gamma control signal is issued to an image processing apparatus capable of performing image processing corresponding to the gamma control signal, the controller can be released earlier by the time taken for image processing. That is, efficient processing corresponding to a designated image processing apparatus can be performed.

As many apparently widely different embodiments of the present invention can be made without departing from the spirit and scope thereof, it is to be understood that the invention is not limited to the specific embodiments thereof as defined in the appended claims.

What is claimed is:

1. An image processing system comprising a host system, a controller external to and separate from said host system, and an image processing apparatus, wherein said host system comprises selection means for selecting a color processing command representing conditions of plural color processing operations within said image processing apparatus;

wherein said controller comprises converting means for converting the color processing command into a control signal for controlling the plural color processing operations within said image processing apparatus; and wherein said image processing apparatus comprises color processing means for performing color processing on image data according to the control signal.

2. A system according to claim 1, wherein the color processing command corresponds to a type of image.

3. A system according to claim 2, wherein the type of image includes a scanner image and computer graphics.

4. A system according to claim 1, wherein said image processing system generates one image constituted by a plurality of images, and said selection means selects an area and the color processing command for each of the images.

5. A system according to claim 1, wherein said image processing apparatus comprises image formation means for forming an image based on the color-processed image data.

\* \* \* \* \*